E. C. SPECKHARD.
STEERING WHEEL.
APPLICATION FILED JUNE 18, 1921.

1,438,193.

Patented Dec. 12, 1922.

INVENTOR

BY

ATTORNEY

Patented Dec. 12, 1922.

UNITED STATES PATENT OFFICE.

EVAN C. SPECKHARD, OF SAGINAW, MICHIGAN.

STEERING WHEEL.

Application filed June 18, 1921. Serial No. 478,777.

*To all whom it may concern:*

Be it known that I, EVAN C. SPECKHARD, a citizen of the United States, residing at Saginaw, in the county of Saginaw and State of Michigan, have invented certain new and useful Improvements in Steering Wheels; and I do hereby declare the following to be a full, clear, and exact description of the invention, such as will enable others skilled in the art to which it appertains to make and use the same.

This invention relates to steering wheels and pertains more particularly to steering wheels for use on motor vehicles and the like.

The object of my invention is to provide a strong steering wheel of attractive appearance so arranged as to provide firm grips for the fingers, either around the periphery of the rim as is usual in steering wheels of this character, or radially, as described, so that the operator may rest the muscles of his hands and arms by changing the position of his hands from one part to another of the steering wheel without reducing his capacity for instantly gripping the wheel with great force in case of emergency, and without again shifting the position of his hands.

With this and certain other objects in view, which will appear later in the specification, my invention comprises the device described and claimed and the equivalents thereof.

In the drawings, Fig. 1 is a top plan view of a steering wheel made in accordance with my invention.

Figure 1:
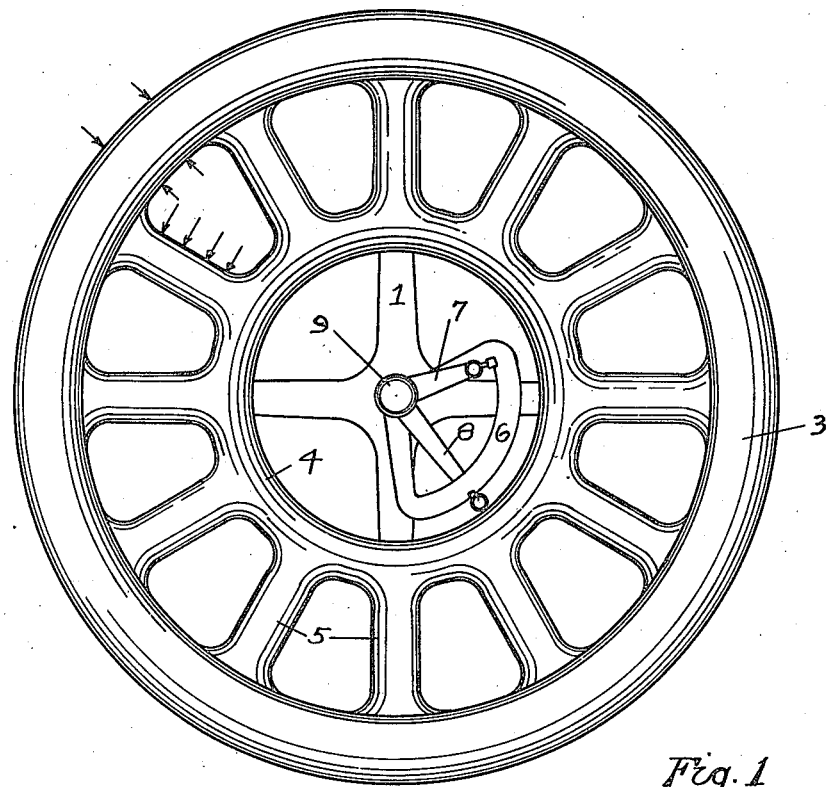

As is clearly shown in the drawings, the divice consists in the usual spider 1, or any suitable equivalent thereof, carried by the steering post 2 and having the usual rim 3.

In my improvement I provide an additional inner rim 4 connected to the outer rim by spokes 5, the length of the spokes, that is, the radial distance between the inner and outer rims, preferably being sufficient to accommodate the width of three fingers of the driver's hand when placed upon the spoke 5, as indicated by the arrows in Fig. 1.

The spokes 5 are spaced apart circumferentially on the outer rim far enough to accommodate the width of the driver's hand around the rim, as indicated by the arrows on the rim 3 in Fig. 1.

The inner rim 4 may be separate from the spider 1 and is preferably supported by and located in the same plane with the rim 3.

Within the circle of rim 4 may be located the usual quadrant 6 with its control levers 7 and 8 and the usual signal button 9 mounted on the steering post 2.

Figure 2:
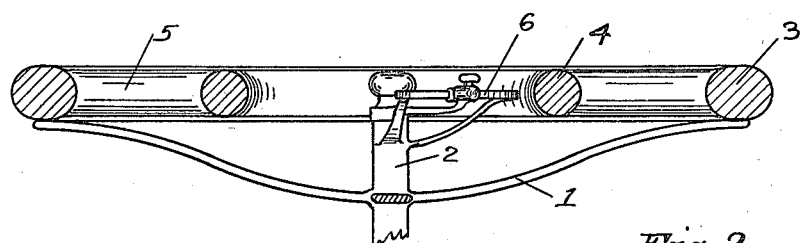
Fig. 2 is a part sectional side elevation of the same.
Figure 3:
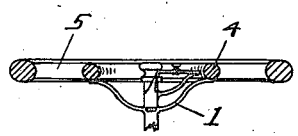
Fig. 3 is a part sectional side view of a modified form of my device.

In the modified form shown in Fig. 3, the spider is arranged to be fastened to the inner rim 4 instead of to the outer rim 3, as illustrated in Figs. 1 and 2, the operation of the wheel being the same in both cases.

By the means above described I have produced a simple and inexpensive steering wheel that affords, by means of the inner rim 4 and the finger-grip spokes 5, a strong and substantial structure giving in addition to the usual grip on the outer rim 3, a firm hand grip and convenient rest in a radial position, enabling the operator to shift the positions of his hands at will from circumferential to radial, yet enabling him to grip the wheel with great force when necessary without changing the position of his hands.

Having thus described my invention, what I claim and desire to secure by Letters Patent is:

1. In a steering wheel including a spider, an outer rim secured to said spider, an inner rim located within the outer rim and spaced therefrom, a plurality of finger-grip spokes connecting said outer and inner rims, said inner rim, outer rim and spokes formed integral, said connecting spokes spaced around the rims to provide finger-grip spaces on said outer rim between the spokes.

2. In a steering wheel including a spider, an outer rim secured to said spider, an inner rim located within the outer rim, and substantially in the plane thereof and spaced therefrom, a plurality of finger-grip spokes connecting said outer and inner rims, said spokes secured to said inner rim, outer rim and spokes formed integral, said connecting outer rim at points spaced apart thereon to provide finger-grip spaces between the spokes.

3. In a steering wheel including a spider, an outer rim, an inner rim located within the outer rim and substantially in the plane thereof and spaced therefrom, a plurality of finger-grip spokes connecting said outer and inner rims and integral with said rims, said connecting spokes secured to said outer rim at points spaced apart therefrom to provide finger-grip spaces between the spokes, said spider secured to one of said rims, for the purposes set forth.

4. In a steering wheel including a spider, an outer rim, an inner rim located within the outer rim and substantially in the plane thereof, and spaced therefrom, a plurality of finger-grip spokes connecting said outer and inner rims and integral with said rims, said connecting spokes secured to said outer rim at points spaced apart therefrom to provide finger-grip spaces between the spokes, said rims carried by said spider.

In testimony whereof, I affix my signature.

EVAN C. SPECKHARD.